Patented Feb. 27, 1951

2,543,397

UNITED STATES PATENT OFFICE 2,543,397

HERBICIDAL COMPOSITIONS CONTAINING ESTERS OF CHLORINATED PHENOXYACETIC ACIDS

William W. Allen, Ambler, Pa., assignor to American Chemical Paint Company, Ambler, Pa., a corporation of Delaware No Drawing. Application August 15, 1949,
Serial No. 110,457

7 Claims. (Cl. 71—2.6)

The present invention relates to esters of chlorinated phenoxyacetic acids, and more particularly to the esterification products of 2.4-dichlorophenoxyacetic acid and 2.4.5-trichlorophenoxyacetic acid with the ethers of ethylene glycol.

The primary object of the invention is to provide a wholly new class of esters of chlorinated phenoxyacetic acids, which may be used for the various purposes for which the acids themselves or the conventional esters have been previously used but to better advantage and without the shortcomings inherent in the previously used 2.4-D and 2.4.5-T compounds.

At this point, it is to be noted that Patent No. 2,390,941, issued December 11, 1945, to the American Chemical Paint Company of Ambler, Pennsylvania, as assignee of Franklin D. Jones, discloses a wholly new class of systemic or translocated herbicides containing a halogenated phenoxy monocarboxylic aliphatic acid, salt or ester thereof. The preferred halogenated products mentioned in the patent are the chlorinated phenoxyacetic compounds such as 2.4-dichlorophenoxyacetic acid, 2.4.5-trichlorophenoxyacetic acid, and their conventional salts and esters. Formulations having these compounds as their active ingredients have become increasingly important in the control of weeds, and now constitute a very important class of selective weed-killers. The conventional esters of 2.4-D and 2.4.5-T acids are generally considered to be the best all-around systemic selective herbicides. However, they do have one very serious shortcoming or drawback.

The shortcoming or drawback just referred to may be described by the term "biological volatility," by which is meant the tendency of the conventional esters of 2.4-D and 2.4.5-T acid to kill or seriously injure vegetation to which they have not been applied. Conventional esters are known to have exerted toxic effects due to biological volatility at considerable distances from points of actual application, and for this reason the Federal Government as well as many states have found it necessary to issue very stringent regulations as to the use and labelling of ester formulations. Needless to state, the field of usefulness of such formulations has been greatly curtailed.

Another very important object of the invention is to provide a new class of esters of 2.4-D and 2.4.5-T acids, which are entirely or substantially free of the "biological volatility" previously referred to, and which for this reason lend themselves for herbicidal use where the conventional esters cannot be used or can only be used with attendant danger to desired vegetation.

Another object of considerable importance is to provide a new class of esters which can be prepared very economically or inexpensively, and which can be embodied or incorporated into emulsions, solutions, dispersions or other solubilized form in a relatively simple, inexpensive manner, and when so formulated can be readily applied with conventional equipment to weeds in the immediate presence of desired vegetation.

The present invention is based in large measure upon the discovery or observation that 2.4-D acid and 2.4.5-T acid can be readily esterified by means of the ethers of ethylene glycol, and that the resulting esters can be used for the same purposes and in substantially the same manner as the conventional esters without, however, manifesting the "biological volatility," which has proved such a disadvantage in the case of said prior art esters.

It is to be noted at this point that many of the ethers of ethylene glycol are available on the market under the trade-mark "Cellosolves," the ethylene glycol monoethyl ether or 2-ethoxy ethanol being referred to simply as "Cellosolve," and the others being referred to as "Cellosolve" with a prefix such as "methyl," "propyl," "butyl," "benzyl," "phenyl," etc., to indicate the nature of the substituent which has replaced the "ethoxy" group. Thus, methyl "Cellusolve" is ethylene glycol monomethyl ether or methoxy ethanol, butyl "Cellosolve" is glycol butyl ether or 2-butoxy ethanol, etc. All the "Cellosolves" are applicable for the esterification of 2.4-D acid and 2.4.5-T acid, and the resulting products are, as far as the inventor has been able to ascertain, new chemical individuals possessing unique properties which render them eminently suitable for many purposes. At the present time, their greatest field of usefulness appears to be in the agricultural field.

The esterification may be readily carried out by conventional procedures, and no claim is made in this application covering the esterification process. The following examples are given, but the invention is not in any way limited thereto:

EXAMPLE I 2.4-D acid (221 grams) is mixed with 125 grams of butyl "Cellosolve," and heated gradually to 175–180° C. in a flask equipped with a condenser to condense the evolved water and what little butyl "Cellosolve" is driven over by the heat. After two hours, the esterification is practically complete and the heating may be stopped. After the resulting ester is cooled down, the free acid may be readily removed by washing the ester with dilute triethanolamine solution and then with water. The purified ester may be dried by treatment with anhydrous sodium sulfate. The residual butyl "Cellosolve" may be readily separated from the condensed water by heating the water and decanting off the "Cellosolve" layer.

The butyl "Cellosolve" ester of 2.4-D acid prepared in accordance with the foregoing example is a liquid with a specific gravity of approximately 1,232 at 20° C. and a boiling point of 156–162° C. at 1 mm. pressure.

EXAMPLE II

The butyl "Cellosolve" ester of 2.4.5-T acid is made in exactly the same way as stated under Example I, except that the quantity of 2.4.5-T acid used is 255.5 grams.

The butyl "Cellosolve" ester of 2.4.5-T acid made in accordance with Example II is a liquid with a specific gravity about 1.280 at 20° C., and a boiling point of approximately 163–166 at 1 mm. pressure.

The other "Cellosolve" esters of either 2.4-D acid or 2.4.5-T acid may be made in substantially the same way, using the ether corresponding to the desired end products. For instance, "Cellosolve," methyl "Cellosolve," propyl "Cellosolve," benzyl "Cellosolve," or phenyl "Cellosolve" may be substituted in whole or in part for the butyl "Cellosolve" of Examples I and II.

*Table of properties*

| Compound | Specific Gravity | Boiling Point at 1 mm. | Setting Point |
|---|---|---|---|
| | | ° C. | ° C. |
| Ester of 2.4-D acid: | | | |
| Methyl "Cellosolve" | 1.330 (20° C.) | 153–158 | 18 |
| "Cellosolve" | 1.302 (20° C.) | 150–155 | |
| Butyl "Cellosolve" | 1.232 (20° C.) | 156–162 | |
| Ester of 2.4.5-T acid: | | | |
| Methyl "Cellosolve" | 1.410 (23° C.) (superfused) | 145–150 | 38 |
| "Cellosolve" | 1.370 (20° C.) | | |
| Butyl "Cellosolve" | 1.280 (20° C.) | 163–166 | |

As previously stated, the esters of the invention are substantially free of the "biological volatility" exhibited by the conventional esters of 2.4-D acid and 2.4.5-T acid. This can be demonstrated in several ways. For instance, two Petri dishes, one containing the butoxy ethanol (butyl "Cellosolve") ester of 2.4-D acid, and the other containing the conventional ethyl ester, are placed in the midst of susceptible vegetation. After an exposure of several days, it will be seen that the vegetation surrounding the dish containing the conventional ester is dying or exhibiting marked degrees of epinasty, whereas there is no deformation or semblance of injury in the vegetation surrounding the other dish. Another test of the same phenomenon consists in exposing a susceptible plant such as a tomato plant to each of the two types of esters under a bell jar.

Extensive experimentation has shown that the novel esters of the present invention may be formulated with various vehicles including solubilizing agents, emulsifiers, dispersing agents, wetting agents, stickers, etc. In the case of certain emulsifiers or dispersing agents, mutual solvents or cosolvents may be used to advantage. Concentrated mixtures of the esters with the various vehicles may be made up, and diluted to desired concentrations with water, oil or other diluent at or prior to the time of application.

Formulations containing the esters of the invention are on an acid equivalent basis generally equal in potency and effectiveness to the conventional esters but are substantially free of the "biological volatility" which has greatly restricted the use of the conventional esters. As in the case of the conventional esters, the phytocidal effect can be stepped up or intensified by the addition of oils which themselves need not be phytotoxic. Instead of or in addition to the oils, other substances having herbicidal activity may be incorporated in the formulation.

The following herbicidal compositions are given by way of example, the quantities being by weight:

EXAMPLE III

| | Per cent |
|---|---|
| Butoxy ethanol ester of 2.4-D acid | 11.2 |
| Butoxy ethanol ester of 2.4.5-T acid | 23.5 |
| Dispersing agent | 6.0 |
| Cosolvent | 4.0 |
| Heavy aromatic naphtha | 55.3 |

EXAMPLE IV

| | Per cent |
|---|---|
| Butoxy ethanol ester of 2.4.5-T acid | 47.5 |
| Dispersing agent | 10.0 |
| Cosolvent | 4.0 |
| Heavy aromatic naphtha | 38.5 |

EXAMPLE V

| | Per cent |
|---|---|
| Methyl "Cellosolve" ester of 2.4-D acid | 30 |
| Dispersing agent | 10 |
| Cosolvent | 20 |
| Aromatic naphtha | 40 |

EXAMPLE VI

| | Per cent |
|---|---|
| Methyl "Cellosolve" ester of 2.4-D acid | 13 |
| Dispersing agent | 5 |
| Cosolvent | 5 |
| Oil | 77 |

EXAMPLE VII

| | Per cent |
|---|---|
| Methyl "Cellosolve" ester of 2.4-D acid | 15 |
| Mahogany soap | 20 |
| Cosolvent | 5 |
| Oil | 60 |

EXAMPLE VIII

| | Per cent |
|---|---|
| Methyl "Cellosolve" ester of 2.4-D acid | 90 |
| Atlas G9816T (polyethylene sorbitan esters of mixed fatty and resin acids) | 10 |

The specified esters in the foregoing examples are those which are preferred, but it is possible to utilize any one or more of the other esters of the invention in substantially the same or equivalent proportions.

Many surface active agents are suitable as dispersing agents, and in Example III the preferred agent is Atlas G8916F, which contains polyethylene sorbitan esters of mixed fatty and resin acids, and in Example IV, the preferred agent is Antarox B–100, which consists essentially of polyethylene glycol oleate. As indicated, mahogany soap, which is also known as naphthenic soap, petroleum sludge soap and sulfonate naphthenate, is used in Example V. Practically any mutual solvent or cosolvent may be used in Examples III to VII. The high molecular weight straight chain alcohols exemplified by butanol, secondary butanol, methyl amyl alcohol and butyl "Cellosolve" have been found particularly suitable.

The formulation of Example VIII lends itself to admixture with several volumes of any oil, preferably a mineral oil such as heavy aromatic naphtha derived from petroleum or coal tar, fuel oil, and diesel oil, and subsequent emulsification in water.

The compositions containing the esters of the invention may be applied to the weeds in substantially the same manner as formulations containing the conventional esters, but special precautions to prevent the killing of wanted plants in the immediate vicinity are unnecessary.

In conclusion, it is to be understood that the foregoing disclosure has been made rather detailed to comply with the patent statutes, and is not to restrict the invention beyond what is required by the state of the prior art.

I claim:

1. A herbicidal composition containing as an active ingredient at least one ester of an acid of the group consisting of 2.4-dichlorophenoxyacetic acid and 2.4.5-trichlorophenoxyacetic acid with an ether alcohol of the formula $R.O.CH_2.CH_2OH$, wherein R is of the group consisting of methyl, ethyl, propyl, butyl, benzyl and phenyl, said active ingredient being present in phytocidal concentration.

2. A herbicidal composition containing as its active ingredient a mixture of esters of acids of the group consisting of 2.4-dichlorophenoxyacetic acid and 2.4.5-trichlorophenoxyacetic acid with an ether alcohol of the formula $R.O.CH_2.CH_2OH$, wherein R is of the group consisting of methyl, ethyl, propyl, butyl, benzyl and phenyl, said active ingredient being present in phytocidal concentration.

3. A herbicidal composition containing as an active ingredient at least one ester of an acid of the group consisting of 2.4-dichlorophenoxyacetic acid and 2.4.5-trichlorophenoxyacetic acid with an ether alcohol of the formula $R.O.CH_2.CH_2OH$, wherein R is butyl, said active ingredient being present in phytocidal concentration.

4. A herbicidal composition containing as an active ingredient at least one ester of an acid of the group consisting of 2.4-dichlorophenoxyacetic acid and 2.4.5-trichlorophenoxyacetic acid with an ether alcohol of the formula $R.O.CH_2.CH_2OH$, wherein R is ethyl, said active ingredient being present in phytocidal concentration.

5. A herbicidal composition containing as an active ingredient at least one ester of an acid of the group consisting of 2.4-dichlorophenoxyacetic acid and 2.4.5-trichlorophenoxyacetic acid with an ether alcohol of the formula $R.O.CH_2.CH_2OH$, wherein R is methyl, said active ingredient being present in phytocidal concentration.

6. A herbicidal composition containing as an active ingredient the 2-butoxy ethanol ester of 2.4-dichlorophenoxyacetic acid, said active ingredient being present in phytocidal concentration.

7. A herbicidal composition containing as its active ingredient a mixture of the 2-butoxy ethanol ester of 2.4-dichlorophenoxyacetic acid, and of the 2-butoxy ethanol ester of 2.4.5-trichlorophenoxyacetic acid, said active ingredient being present in phytocidal concentration.

WILLIAM W. ALLEN.

REFERENCES CITED

The following references are of record in the file of this patent:

UNITED STATES PATENTS

| Number | Name | Date |
|---|---|---|
| 1,974,810 | Dvornikoff | Sept. 25, 1934 |
| 2,142,126 | Grether | Jan. 3, 1939 |
| 2,166,557 | Stoesser | July 18, 1939 |
| 2,390,941 | Jones | Dec. 11, 1945 |
| 2,396,513 | Jones | Mar. 12, 1946 |
| 2,523,227 | Mullison | Sept. 19, 1950 |
| 2,537,228 | Mullison | Sept. 19, 1950 |